US012772119B2

(12) United States Patent
Choi et al.

(10) Patent No.: US 12,772,119 B2
(45) Date of Patent: Oct. 20, 2026

(54) ELECTRONIC DEVICE FOR PERFORMING WIRELESS COMMUNICATION BASED ON MULTICAST MODE AND OPERATING METHOD THEREOF

(71) Applicant: Samsung Electronics Co., Ltd., Suwon-si (KR)

(72) Inventors: Jiwon Choi, Suwon-si (KR); Hyeonsoo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 314 days.

(21) Appl. No.: 18/509,893

(22) Filed: Nov. 15, 2023

(65) Prior Publication Data

US 2024/0196279 A1 Jun. 13, 2024

Related U.S. Application Data

(63) Continuation of application No. PCT/KR2023/018152, filed on Nov. 13, 2023.

(30) Foreign Application Priority Data

Dec. 8, 2022 (KR) ........................ 10-2022-0170226

(51) Int. Cl.
*H04W 36/00* (2009.01)

(52) U.S. Cl.
CPC ... *H04W 36/0007* (2018.08); *H04W 36/0058* (2018.08); *H04W 36/00835* (2018.08)

(58) Field of Classification Search
CPC ......... H04W 36/0007; H04W 36/0058; H04W 36/00835; H04W 4/06; H04W 24/08; H04W 24/10; H04B 17/309
See application file for complete search history.

(56) References Cited

U.S. PATENT DOCUMENTS 10,149,184 B2 12/2018 Kim et al.
10,477,443 B2 11/2019 Ranta-Aho et al.
(Continued)

FOREIGN PATENT DOCUMENTS

EP 4 233 387 A1 8/2023
JP 2017-041907 A 2/2017
(Continued)

OTHER PUBLICATIONS

International Search Report dated Feb. 20, 2024, issued in International Patent Application No. PCT/KR2023/018152.
(Continued)

*Primary Examiner* — Sujoy K Kundu
*Assistant Examiner* — Samuel Dilan Rutnam
(74) *Attorney, Agent, or Firm* — Jefferson IP Law, LLP

(57) ABSTRACT

A device and a method for performing wireless communication based on a multicast mode in an electronic device are provided. The electronic device includes a communication circuit, a memory, and at least one processor, wherein the at least one processor may receive data from a first cell supporting the multimedia broadcast multicast service (MBMS) through the communication circuit, based on a multicast mode, may detect a second cell, based on channel state information about the first cell, may perform a measurement report related to the second cell when the second cell is included in the MBMS support list, and may restrict the measurement report related to the second cell when the second cell is included in the MBMS nonsupport list.

9 Claims, 8 Drawing Sheets

(56) References Cited

U.S. PATENT DOCUMENTS

| | | | | |
|---|---|---|---|---|
| 2014/0010142 | A1* | 1/2014 | Ranta-Aho ....... | H04W 36/0061 370/312 |
| 2014/0185455 | A1 | 7/2014 | Balasubramanian et al. | |
| 2014/0301210 | A1* | 10/2014 | Kim ...................... | H04W 24/08 370/241 |
| 2016/0080990 | A1 | 3/2016 | Thiruvenkatachari et al. | |
| 2018/0041987 | A1 | 2/2018 | Chang et al. | |
| 2018/0077631 | A1 | 3/2018 | Byun et al. | |
| 2022/0132467 | A1 | 4/2022 | Shrivastava et al. | |
| 2022/0248367 | A1 | 8/2022 | Kumar et al. | |
| 2024/0120978 | A1* | 4/2024 | Zhang .................. | H04B 7/0626 |

FOREIGN PATENT DOCUMENTS

| | | | |
|---|---|---|---|
| JP | 6561131 | B2 | 8/2019 |
| KR | 10-2014-0006064 | A | 1/2014 |
| KR | 10-2014-0121594 | A | 10/2014 |
| KR | 10-2017-0056864 | A | 5/2017 |
| WO | 2022/087253 | A1 | 4/2022 |
| WO | 2022/205291 | A1 | 10/2022 |

OTHER PUBLICATIONS

Xiaomi Communications, Summary of [Post114-e][073][MBS] Service continuity for Delivery Mode 2 (Xiaomi), R2-2108799, 3GPP TSG-RAN WG2 #115-e, Aug. 6, 2021.

Kyocera, Details of control plane aspects for delivery mode 2 in NR MBS, R2-2107999, 3GPP TSGRAN WG2 #115-e, Aug. 6, 2021.

* cited by examiner

ELECTRONIC DEVICE FOR PERFORMING WIRELESS COMMUNICATION BASED ON MULTICAST MODE AND OPERATING METHOD THEREOF

CROSS-REFERENCE TO RELATED APPLICATION(S)

This application is a continuation application, claiming priority under § 365(c), of an International application No. PCT/KR2023/018152, filed on Nov. 13, 2023, which is based on and claims the benefit of a Korean patent application number 10-2022-0170226, filed on Dec. 8, 2022, in the Korean Intellectual Property Office, the disclosure of which is incorporated by reference herein in its entirety.

TECHNICAL FIELD

The disclosure relates to an electronic device for performing wireless communication based on a multicast mode and an operating method thereof.

BACKGROUND ART

When transmitting the same data to a plurality of electronic devices located in a specific area, a network (e.g., a base station) of a wireless communication system may transmit the data to the plurality of electronic devices, based on a multicast mode or a broadcast mode.

The above information is presented as background information only to assist with an understanding of the disclosure. No determination has been made, and no assertion is made, as to whether any of the above might be applicable as prior art with regard to the disclosure.

DISCLOSURE

When an electronic device is located within an area (e.g., a cell) in which a multimedia broadcast multicast service (MBMS) is supported, the electronic device may perform multicast-mode communication (e.g., a call) with a network. For example, the electronic device receives data (e.g., multicast-broadcast single-frequency network (MBSFN) data) through a multicast control channel (MCCH), based on information related to an MBMS network obtained from the network.

When the electronic device moves to (or enters) an area (e.g., a cell) in which the MBMS is not supported while performing the multicast-mode communication, the multicast-mode communication may be terminated and a mode for communication with the network may be switched to a unicast mode. The electronic device may experience a delay in communication or temporary disconnection of communication due to a switch from the multicast method to the unicast mode.

Aspects of the disclosure are to address at least the above-mentioned problems and/or disadvantages and to provide at least the advantages described below. Accordingly, an aspect of the disclosure is to provide a device and a method for maintaining multicast-mode communication in an electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a communication circuit, a memory configured to store information related to a multimedia broadcast multicast service (MBMS) support list including information related to at least one cell supporting an MBMS and an MBMS nonsupport list including information related to at least one cell not supporting the MBMS, and at least one processor operatively connected to the communication circuit and the memory. The processor receives data from a first cell supporting the MBMS through the communication circuit, based on a multicast mode, detects a second cell, based on channel state information about the first cell, performs a measurement report related to the second cell when the second cell is included in the MBMS support list, and restricts the measurement report related to the second cell when the second cell is included in the MBMS nonsupport list.

In accordance with another aspect of the disclosure, an operating method of an electronic device is provided. The operating method includes receiving data from a first cell supporting an MBMS, based on a multicast mode, detecting a second cell, based on channel state information about the first cell, performing a measurement report related to the second cell when the second cell is included in an MBMS support list stored in a memory of the electronic device, and restricting the measurement report related to the second cell when the second cell is included in an MBMS nonsupport list stored in the memory of the electronic device.

In accordance with an aspect of the disclosure, a non-transitory computer-readable recording medium (or computer program product) that stores one or more programs is provided. The one or more programs include an instruction, when executed by a processor of an electronic device, to perform an operation of receiving data from a first cell supporting an MBMS, based on a multicast mode, an operation of detecting a second cell, based on channel state information about the first cell, an operation of performing a measurement report related to the second cell when the second cell is included in an MBMS support list stored in a memory of the electronic device, and an operation of restricting the measurement report related to the second cell when the second cell is included in an MBMS nonsupport list stored in the memory of the electronic device.

According to an embodiment of the disclosure, when a cell not supporting an MBMS is detected while an electronic device performs multicast-mode communication, a measurement report related to the cell not supporting the MBMS may be restricted, thereby maintaining the multicast-mode communication.

According to various embodiments, when a cell not supporting an MBMS is detected while an electronic device performs multicast-mode communication, a cell reselection-related priority of the cell not supporting the MBMS and/or a serving cell may be updated, thereby maintaining the multicast-mode communication.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

Figure 1:
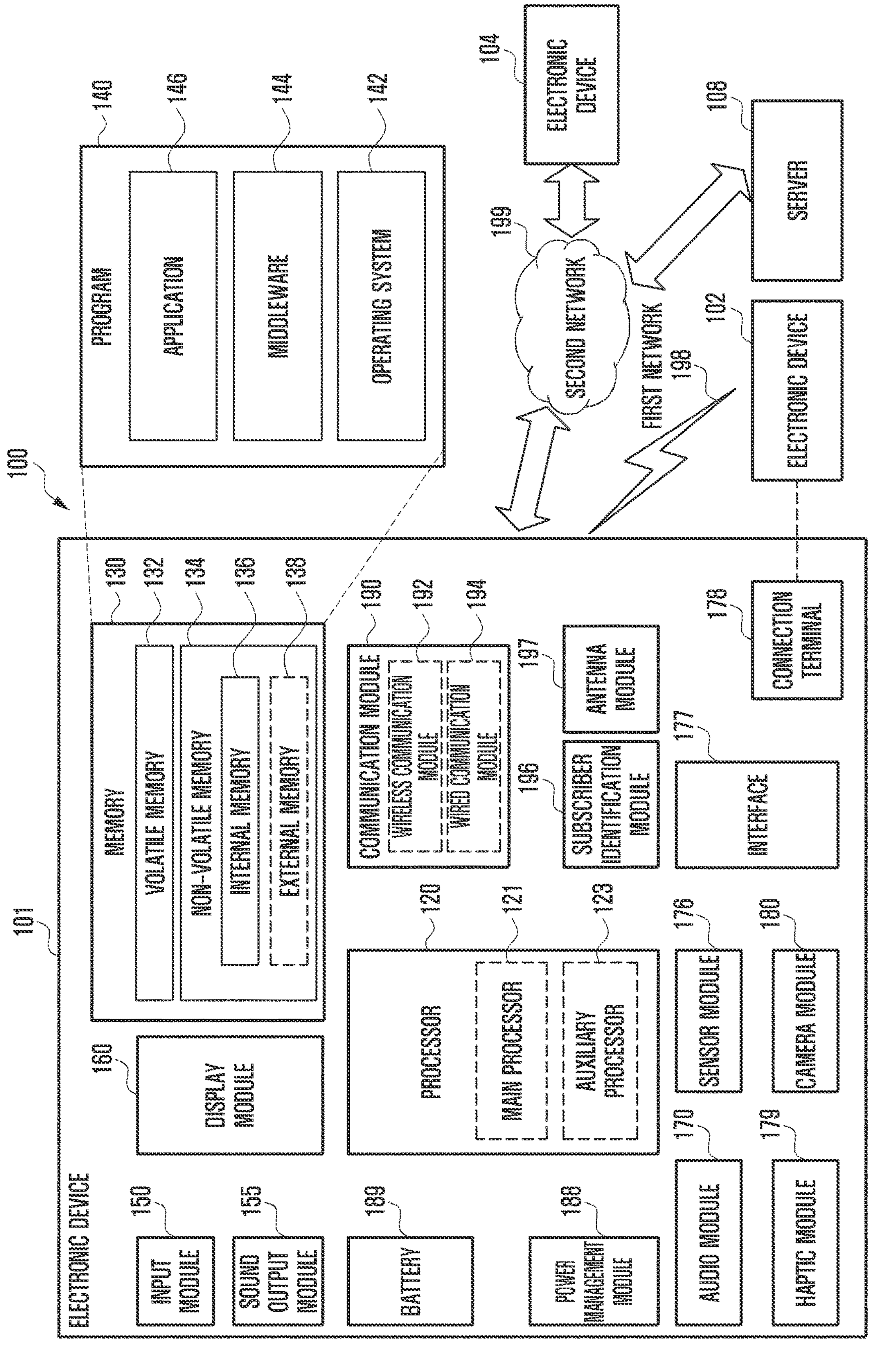
FIG. 1 is a block diagram of an electronic device in a network environment according to an embodiment of the disclosure.

FIG. 1 is a block diagram illustrating an example electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20G gigabits per second (bps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC. According to an embodiment, the subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include a patch array antenna and/or a dipole array antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices (external electronic devices 102 or 104 or the server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
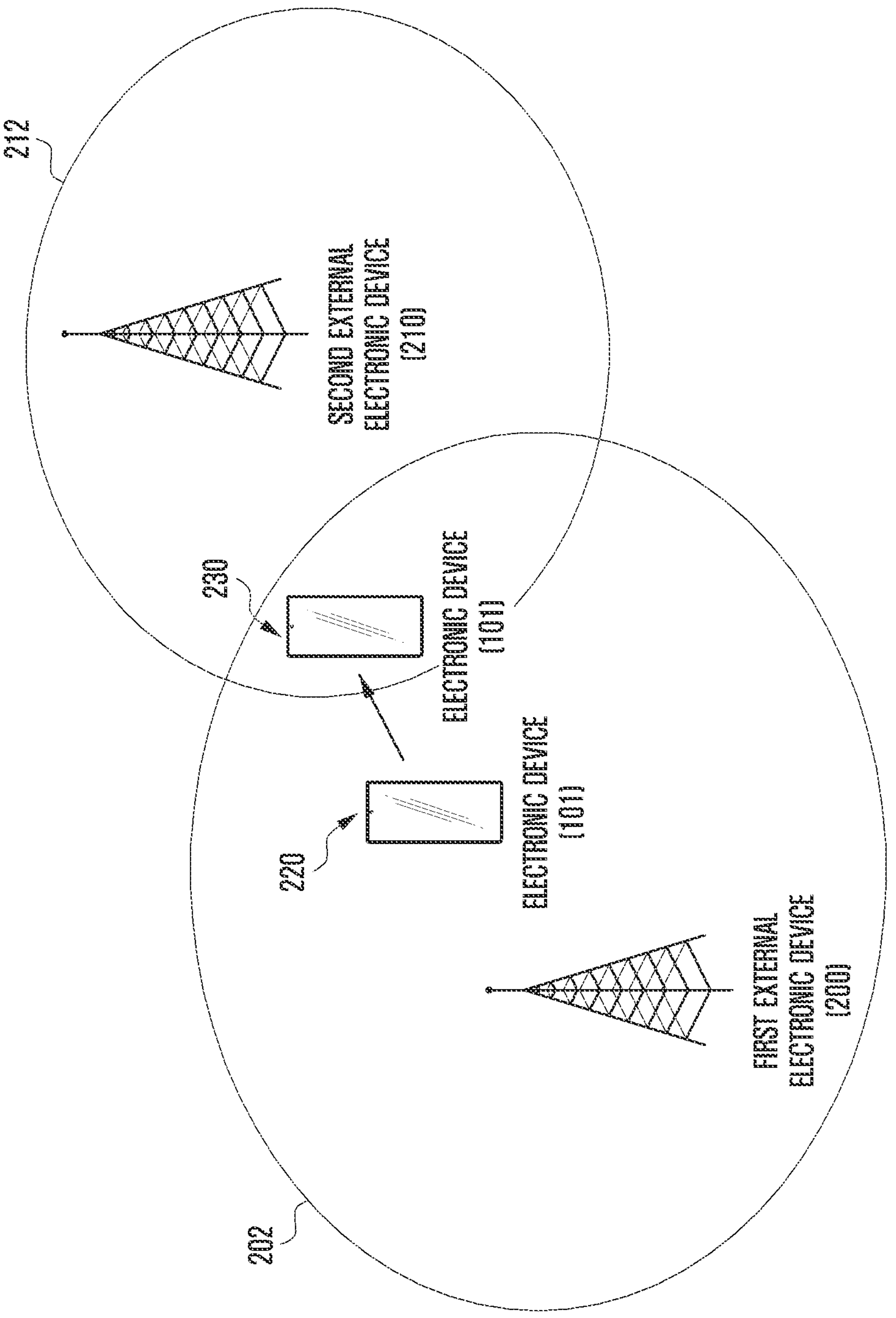
FIG. 2 illustrates an example of a wireless communication system for communication based on a multicast mode according to an embodiment of the disclosure.

FIG. 2 illustrates an example of a wireless communication system for communication based on a multicast mode according to an embodiment of the disclosure. For example, an electronic device 101 of FIG. 2 may be at least partly similar to the electronic device 101 of FIG. 1, or may include another embodiment of an electronic device.

Referring to FIG. 2, according to various embodiments, when the electronic device 101 is located within a first service area 202 of a first external electronic device 200 supporting a multimedia broadcast multicast service (MBMS) function (220 and/or 230), the electronic device 101 may receive data (e.g., a media packet) from the first external electronic device 200 through a unicast mode or a multicast mode. According to an embodiment, the electronic device 101 may transmit data to the first external electronic device 200 through the unicast mode. For example, the first external electronic device 200 is a network entity that transmits and/or receives data to and/or from at least one electronic device (e.g., the electronic device 101) located within the first service area 202, and may include a base station (e.g., an evolved node B (eNB)) or a transmission node (e.g., a transmission and reception point (TRP)). For example, the first service area 202 denotes an area that enables the first external electronic device 200 to communicate with at least one electronic device.

According to various embodiments, the first external electronic device 200 may transmit data in the unicast or multicast mode, based on the number of electronic devices included in a specific group located within an MBMS area. According to another embodiment, an MBMS server may identify at least one electronic device (e.g., the electronic device 101) located in the MBMS area, based on location information (e.g., a location report message) periodically received from the at least one electronic device through at least one external electronic device (e.g., the first external electronic device 200) included in the MBMS area. The MBMS server may identify at least one electronic device (e.g., the electronic device 101) to perform a group call in the specific group, based on information related to a group call received from the at least one electronic device through at least one external electronic device (e.g., the first external electronic device 200) included in the MBMS area. For example, the MBMS server is a network entity that provides the MBMS function (e.g., a mission critical push-to-talk (MCPTT) function) to at least one electronic device (e.g., the electronic device 101), and may communicate with at least one electronic device (e.g., the electronic device 101) through at least one external electronic device (e.g., the first external electronic device 200). For example, the MBMS server includes a group communication service enabler application server (GCSE-AS). For example, the MBMS area includes a service area (e.g., the first service area 202) of at least one external electronic device (e.g., the first external electronic device 200) that supports the MBMS function.

According to yet another embodiment, when the number of electronic devices included in the specific group within the MBMS area is less than a specified reference number, based on control of the MBMS server, the first external electronic device 200 may determine that the unicast mode is used for the electronic devices included in the specific group within the MBMS area. For example, the first external electronic device 200 transmits data (e.g., a media packet) to the electronic device 101 located in the first service area 202 in the unicast mode. For example, the electronic device 101 transmits data to the first external electronic device 200 in the unicast mode.

According to yet another embodiment, when the number of electronic devices included in the specific group within the MBMS area exceeds the specified reference number, the first external electronic device 200 may determine that the multicast mode is used for the electronic devices included in the specific group within the MBMS area. For example, the first external electronic device 200 transmits data (e.g., a media packet) to the electronic device 101 in the specific group located in the first service area 202 in the multicast mode. For example, the electronic device 101 transmits data to the first external electronic device 200 in the unicast mode.

According to various embodiments, the electronic device 101 may detect a second external electronic device 210 during multicast-mode communication (e.g., data reception) with the first external electronic device 200. According to yet another embodiment, when state information about a channel with the first external electronic device 200 satisfies a specified reference condition, the electronic device 101 may identify through a scan whether there is another external electronic device with which the electronic device 101 is able to establish communication. For example, when the electronic device 101 is located in an area where the first service area 202 and a second service area 212 overlap (230), the electronic device 101 detects the second external electronic device 210. For example, a state that satisfies the specified reference condition includes a state in which the state information about the channel with the first external electronic device 200 is a specified first reference quality or lower. For example, the state information about the channel includes at least one of a reference signal received power (RSRP), a reference signal received quality (RSRQ), a received signal strength indicator (RSSI), or a signal-to-interference plus noise ratio (SINR).

According to various embodiments, when detecting the second external electronic device 210 that does not support the MBMS during the multicast-mode communication (e.g., data reception), the electronic device 101 may maintain the communication (or connection) with the first external electronic device 200. According to yet another embodiment, when not receiving system information block (SIB) 13 and SIB 15 from the second external electronic device 210 in a radio resource control (RRC)-idle state or an RRC-inactive state, the electronic device 101 may determine that the second external electronic device 210 does not support the MBMS. When determining that the second external electronic device 210 does not support the MBMS, the electronic device 101 may update a cell reselection-related priority of the first external electronic device 200 and/or a cell reselection-related priority of the second external electronic device 210 such that the first external electronic device 200 that supports the MBMS has a relatively high cell reselection-related priority. For example, the electronic device 101 applies a reference offset value to the cell reselection-related priority of at least one of the first external electronic device 200 or the second external electronic device 210 such that the first external electronic device 200 has a relatively high cell reselection-related priority. For example, when a difference (or difference value) in channel state information between the first external electronic device 200 and the second external electronic device 210 is within a specified reference range, the electronic device 101 maintains the communication (or connection) with the first external electronic device 200, based on update of the cell reselection-related priority. For example, updating the cell reselection-related priority is applied when the first external electronic device 200 and the second external electronic device 210 use the same frequency (or frequency band).

According to yet another embodiment, when the second external electronic device 210 is included in an MBMS nonsupport list in an RRC-connected state, the electronic device 101 may determine that the second external electronic device 210 does not support the MBMS. When determining that the second external electronic device 210 does not support the MBMS, the electronic device 101 may restrict a measurement report related to the second external electronic device 210. For example, when the state information about the channel with the first external electronic device 200 exceeds a specified second reference quality, the electronic device 101 restricts a measurement report related to the second external electronic device 210. For example, when the state information about the channel with the first external electronic device 200 is the specified second standard quality or lower, the electronic device 101 performs a measurement report related to the second external electronic device 210. For example, when the restricted number of measurement reports related to the second external electronic device 210 is a specified reference number or less, the electronic device 101 restricts a measurement report related to the second external electronic device 210. For example, when the restricted number of measurement reports related to the second external electronic device 210 exceeds the specified reference number, the electronic device 101 performs a measurement report related to the second external electronic device 210. For example, the electronic device 101 maintains the communication (or connection) with the first external electronic device 200 by restricting a measurement report related to the second external electronic device 210. For example, restricting a measurement report related to the second external electronic device 210 is a series of operations of not performing a measurement report related to the second external electronic device 210 that does not support the MBMS, and a measurement report related to an external electronic device other than the second external electronic device 210 may be performed. For example, a measurement report related to the second external electronic device 210 includes a series of operations of reporting state information about a downlink channel with the second external electronic device 210 to the first external electronic device 200.

Figure 3:
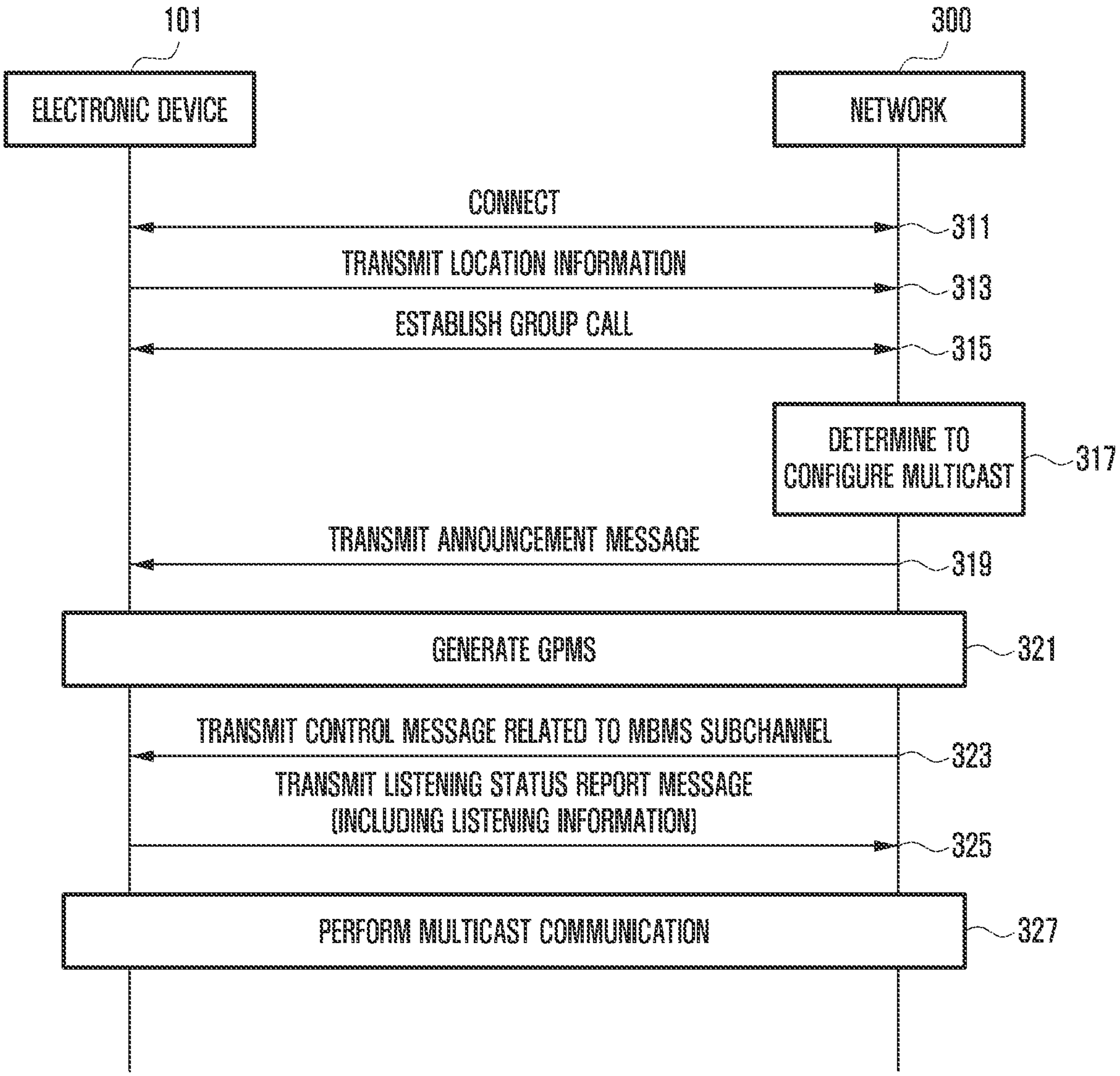
FIG. 3 illustrates an example in which an electronic device performs communication based on a multicast mode according to an embodiment of the disclosure.

FIG. 3 illustrates an example in which an electronic device performs communication based on a multicast mode according to an embodiment of the disclosure. For example, the electronic device of FIG. 3 may be the electronic device 101 of FIG. 1 or 2.

Referring to FIG. 3, according to various embodiments, the electronic device 101 may connect to a network 300 (operation 311). According to an embodiment, the electronic device 101 may obtain an account and/or a password related to an MBMS function (e.g., an MCPTT function), based on execution of an application program related to the MBMS function. For example, the account and/or the password related to the MBMS function are obtained based on a user input. For example, the account and/or the password related to the MBMS function are obtained from a SIM of the electronic device 101. According to another embodiment, when the electronic device 101 logs in to an MBMS server, based on the account and/or the password related to the MBMS function, the electronic device 101 obtains information related to connection to (or registration with) the MBMS server from the network 300 (e.g., a configuration management server (CMS)). The electronic device 101 may connect to (or register with) the MBMS server, based on the information related to the connection to (or registration with) the MBMS server obtained from the network 300. For example, the connection to (or registration with) the network 300 (e.g., the MBMS server) may include a series of operations of the electronic device 101 establishing a communication link with the MBMS server as a network entity through a base station (e.g., the first external electronic device 200 of FIG. 2). For example, the network 300 is a network entity capable of performing communication with the electronic device 101, and may include the first external electronic device 200 of FIG. 2 and/or the MBMS server.

According to various embodiments, when connected to (or registered with) the network 300, the electronic device 101 may periodically transmit location information (e.g., a location report message) to the network 300 (or the MBMS server), based on a specified first period (operation 313). For example, the location information includes at least one of a service area identity (SAI) or an E-UTRAN cell global identifier (ECGI).

According to various embodiments, the electronic device 101 may establish a group call (e.g., an MCPTT group call) with the network 300 (or the MBMS server), based on occurrence of an event related to a start of a group call (operation 315). According to yet another embodiment, the electronic device 101 may transmit information related to the group call to the network 300 (or the MBMS server) to establish the group call, based on the occurrence of the event related to the start of the group call. When receiving a response signal (e.g., 200 OK) to the information related to the group call with the network 300 (or the MBMS server) from the network 300 (or the MBMS server), the electronic device 101 may determine that the group call has been established. For example, establishing the group call includes a series of operations of establishing a group session for the group call. For example, the event related to the start of the group call occurs based on at least one of execution of an application related to a group call, selection of an icon related to a group call, or a user input related to a group call.

According to various embodiments, when the number of electronic devices included in a specific group within a service area (e.g., an MBMS service area) in which the MBMS function is supported exceeds a specified reference number, the network 300 (or the MBMS server) may determine that a multicast mode is used for the electronic devices included in the specific group within the service area (operation 317). According to yet another embodiment, the network 300 (or the MBMS server) may identify, based on the location information periodically received from the electronic device 101, the electronic device 101 (or the number of electronic devices) located in the service area in which the MBMS function is supported. According to yet another embodiment, the network 300 (or the MBMS server) may identify the electronic device 101 (or the number of electronic devices) that is performing the group call in the specific group, based on the information related to the group call received from the electronic device 101.

According to various embodiments, the network 300 (or the MBMS server) may transmit information related to the MBMS function to the electronic device 101 included in the specific group within the MBMS service area, based on determining that the multicast mode is used (operation 319). For example, the information related to the MBMS function may be an announcement message, and includes information related to the MBMS service area, information related to generation of a GPMS (e.g., SDP MIME body), and/or a temporary mobile group identity (TMGI).

According to various embodiments, the electronic device 101 may generate a GPMS with the network 300 (or the MBMS server), based on the information related to the MBMS function received from the network 300 (or the MBMS server) (operation 321). According to yet another embodiment, when the TMGI identified in the information related to the MBMS function matches a TMGI of the service area where the electronic device 101 is located, the electronic device 101 may generate (or establish) the GPMS with the network 300 (or the MBMS server), based on the information related to the generation of the GPMS identified in the information related to the MBMS function.

According to various embodiments, the network 300 (or the MBMS server) may periodically transmit a control message related to an MBMS subchannel through the GPMS, based on a specified second period (operation 323).

According to various embodiments, when the electronic device 101 receives the control message related to the MBMS subchannel from the network 300 (or the MBMS server) through the GPMS (operation 323), the electronic device 101 may transmit a message related to a switch to the multicast mode to the network 300 (or the MBMS server) (operation 325). For example, the message related to the switch to the multicast mode may be a listening status report message including "listening" information, and is transmitted to the network 300 (or the MBMS server) in the form of a SIP message. According to an embodiment, the electronic device 101 may generate a floor control channel and a media channel for multicast, based on information related to generation of the MBMS subchannel included in the control message related to the MBMS subchannel received from the network 300 (or the MBMS server) through the GPMS.

According to various embodiments, the network 300 (or the MBMS server) may transmit data (e.g., a media packet), in the multicast mode, to the electronic device 101 in the specific group located in the service area in which the MBMS function is supported, based on reception of the message related to the switch to the multicast mode (operation 327).

According to various embodiments, the electronic device 101 and the network 300 (or the MBMS server) may establish the group call with the network 300 (or the MBMS server) between a time when the electronic device 101 connects to the network 300 (or the MBMS server) (e.g., operation 311) and a time when the network 300 (or the MBMS server) determines that the multicast mode is used for the electronic devices included in the specific group within the MBMS service area (e.g., operation 317). According to yet another embodiment, when connected to the network 300 (or the MBMS server), the electronic device 101 may establish an MCPTT group call with an MCPTT server 900 before transmitting the location information (e.g., the location report message) to the network 300 (or the MBMS server).

Figure 4:
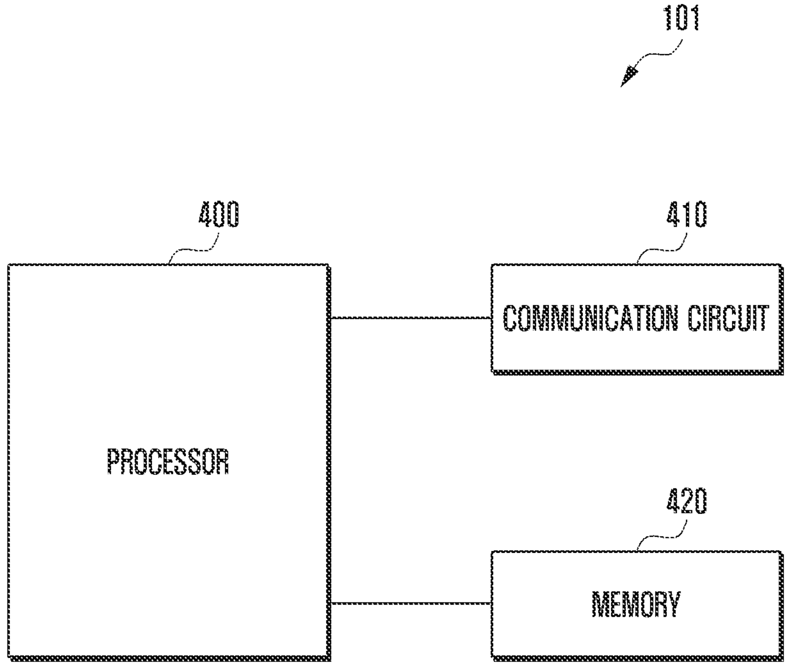
FIG. 4 is a block diagram of an electronic device for performing communication based on a multicast mode according to an embodiment of the disclosure.

FIG. 4 is a block diagram of an electronic device for performing communication based on a multicast mode according to an embodiment of the disclosure. For example, the electronic device 101 of FIG. 4 may be at least partly similar to the electronic device 101 of FIG. 1, 2, or 3, or may include another embodiment of an electronic device.

Referring to FIG. 4, according to various embodiments, the electronic device 101 may include a processor (e.g., including processing circuitry) 400, a communication circuit 410, and/or a memory 420. According to an embodiment, the processor 400 may be substantially the same as the processor 120 of FIG. 1, or may be included in the processor 120. The communication circuit 410 may be substantially the same as the wireless communication module 192 of FIG. 1, or may be included in the wireless communication module 192. The memory 420 may be substantially the same as the memory 130 of FIG. 1, or may be included in the memory 130. According to an embodiment, the processor 400 may be operatively, functionally, and/or electrically connected to the communication circuit 410 and/or the memory 420.

According to various embodiments, the processor 400 may receive data from an external electronic device (e.g., the first external electronic device 200 of FIG. 2) supporting an MBMS in a multicast mode. According to another embodiment, when the electronic device 101 is located within a first service area 202 of the first external electronic device 200 supporting the MBMS, the processor 400 may control the communication circuit 410 to connect to (or register with) an MBMS server through the first external electronic device 200.

According to yet another embodiment, when receiving information related to an MBMS subchannel from the MBMS server through the first external electronic device 200, based on connection to the MBMS server, the processor 400 may generate a floor control channel and a media channel for multicast, based on information related to generation of the MBMS subchannel. For example, the information related to the MBMS subchannel is periodically received from the MBMS server, based on a specified second period. For example, the information related to the MBMS subchannel includes a map-group-to-bearer message. For example, the information related to the generation of the MBMS subchannel includes a floor control port number (e.g., a floor control port number) and/or a media port number (e.g., a media port number).

According to yet another embodiment, the processor 400 may control the communication circuit 410 to transmit information related to a switch to the multicast mode to the MBMS server, based on reception of the information related to the MBMS subchannel. For example, the information related to the switch to the multicast mode is a listening status report message including "listening" information, and may be transmitted in the form of a session initiation protocol (SIP) message to the MBMS server in a unicast mode. According to yet another embodiment, the processor 400 may receive data (e.g., a media packet) from the MBMS server through the communication circuit 410 in the multicast mode, based on transmission of the information related to the switch to the multicast mode. For example, an operation of receiving the data in the multicast mode includes a series of operations of receiving data from the first external electronic device 200 through the media channel for multicast generated based on the information related to the MBMS subchannel.

According to various embodiments, the processor 400 may identify state information about a channel with the external electronic device (e.g., the first external electronic device 200 of FIG. 2) supporting the MBMS during multicast-mode communication (e.g., data reception) with the external electronic device. According to yet another embodiment, the processor 400 may periodically identify the state information about the channel with the first external electronic device 200, based on a specified third period during the multicast-mode communication (e.g., data reception) with the first external electronic device 200. For example, the state information about the channel includes at least one of a reference signal received power (RSRP), a reference signal received quality (RSRQ), a received signal strength indicator (RSSI), or a signal-to-interference plus noise ratio (SINR).

According to various embodiments, the processor 400 may control the communication circuit 410 to perform a scan, based on the state information about the channel with the external electronic device (e.g., the first external electronic device 200) supporting the MBMS. According to yet another embodiment, when the state information about the channel with the first external electronic device 200 satisfies a specified reference condition, the electronic device 101 may identify through the scan whether there is another external electronic device with which the electronic device 101 is able to establish communication. For example, a state that satisfies the specified reference condition includes a state in which the state information about the channel with the first external electronic device 200 is a specified first reference quality or lower.

According to various embodiments, when detecting an external electronic device (e.g., the second external electronic device 210 of FIG. 2) not supporting the MBMS through the scan during the multicast-mode communication (e.g., data reception), the processor 400 may maintain the communication (or connection) with the external electronic device (e.g., the first external electronic device 200) supporting the MBMS. According to yet another embodiment, when the electronic device 101 is in a radio resource control (RRC)-idle state or an RRC-inactive state, the processor 400 may identify through a scan whether system information block (SIB) 13 and SIB 15 are received from the second external electronic device 210. For example, when not receiving SIB 13 and SIB 15 from the second external electronic device 210, the processor 400 determines that the second external electronic device 210 does not support the MBMS. For example, when receiving SIB 13 and SIB 15 from the second external electronic device 210, the processor 400 determines that the second external electronic device 210 supports the MBMS.

According to yet another embodiment, determining that the second external electronic device 210 does not support the MBMS, the processor 400 may update a cell reselection-related priority of the first external electronic device 200 and/or a cell reselection-related priority of the second external electronic device 210 such that the first external electronic device 200 that supports the MBMS has a relatively high cell reselection-related priority. For example, when the first external electronic device 200 and the second external electronic device 210 use the same frequency (or frequency band), the processor 400 updates the cell reselection-related priority of the first external electronic device 200 and/or the cell reselection-related priority of the second external electronic device 210. For example, the processor 400 applies a reference offset value to the cell reselection-related priority of at least one of the first external electronic device 200 or the second external electronic device 210 such that the first external electronic device 200 has a relatively high cell reselection-related priority. For example, a reference offset is applied so that the first external electronic device 200 has a relatively high cell reselection-related priority as shown in Equation 1.

$$R_s = Q_{meas\text{-}s,n} + Q_{Hyst} - Q_{offsettemp} + Q_{offsetscptm} + Q_{threhold\ offset} \qquad \text{Equation 1}$$

For example, $R_s$ denotes the cell reselection-related priority of the external electronic device supporting the MBMS, $Q_{meas\text{-}s}$, n may denote a measured RSRP (or channel state information about the first external electronic device 200) related to cell reselection, $Q_{Hyst}$ denotes a hysteresis value according to ranking criteria, $Q_{offsettemp}$ denotes an additional offset related to cell reselection or cell selection, $Q_{offsetscptm}$ denotes an offset used for cell reselection for reception of a single-cell point-to-multipoint (SCP™) service, and $Q_{threshold\ offset}$ may denote the reference offset applied to update a cell reselection-related priority.

For example, a reference offset is applied so that the second external electronic device 210 has a relatively low cell reselection-related priority as shown in Equation 2.

$$R_n=Q_{meas\text{-}s,n}+Q_{offset}-Q_{offsettemp}+Q_{offsetscptm}-Q_{threhold\ offset} \qquad \text{Equation 2}$$

For example, $R_n$ may denote the cell reselection-related priority of the external electronic device not supporting the MBMS, $Q_{meas\text{-}s}$, n denotes a measured RSRP (or channel state information about the second external electronic device 210) related to cell reselection, $Q_{offset}$ denotes an offset between the external electronic device (or cell) supporting the MBMS and the external electronic device (or cell) not supporting the MBMS, $Q_{offsettemp}$ denotes an additional offset related to cell reselection or cell selection, $Q_{offsetscptm}$ denotes an offset used for cell reselection for reception of a single-cell point-to-multipoint (SCP™) service, and $Q_{threshold\ offset}$ denotes the reference offset applied to update a cell reselection-related priority.

According to yet another embodiment, when a difference (or difference value) in channel state information (e.g., an RSSI) between the first external electronic device 200 and the second external electronic device 210 is within a specified reference range, the electronic device 101 may maintain the communication (or connection) with the first external electronic device 200, based on update of the cell reselection-related priority.

According to yet another embodiment, when the electronic device 101 is in an RRC-connected state, the processor 400 may identify whether the second external electronic device 210 is included in an MBMS nonsupport list or an MBMS supported list. For example, when the second external electronic device 210 detected through the scan is included in the MBMS support list, the processor 400 determines that the second external electronic device 210 supports the MBMS. For example, when the second external electronic device 210 detected through the scan is included in the MBMS nonsupport list, the processor 400 determines that the second external electronic device 210 does not support the MBMS. For example, the MBMS support list includes information (e.g., a frequency and/or a physical cell ID (PCI)) related to an external electronic device (or a cell) supporting the MBMS. For example, the MBMS nonsupport list includes information (e.g., a frequency and/or a physical cell ID (PCI)) related to an external electronic device (or a cell) not supporting the MBMS.

According to yet another embodiment, when determining that the second external electronic device 210 does not support the MBMS, the processor 400 may control the communication circuit 410 to restrict a measurement report related to the second external electronic device 210. For example, when the state information about the channel with the first external electronic device 200 exceeds a specified second reference quality, the processor 400 controls the communication circuit 410 to restrict a measurement report related to the second external electronic device 210. For example, when the state information about the channel with the first external electronic device 200 is the specified second standard quality or lower, the processor 400 controls the communication circuit 410 to perform a measurement report related to the second external electronic device 210. For example, when the restricted number of measurement reports related to the second external electronic device 210 is a specified reference number or less, the processor 400 controls the communication circuit 410 to restrict a measurement report related to the second external electronic device 210. For example, the processor 400 maintains the communication (or connection) with the first external electronic device 200 by restricting a measurement report related to the second external electronic device 210. For example, restricting a measurement report related to the second external electronic device 210 is a series of operations of not performing a measurement report related to the second external electronic device 210 that does not support the MBMS, and a measurement report related to an external electronic device other than the second external electronic device 210 is performed.

According to yet another embodiment, when determining that the second external electronic device 210 supports the MBMS, the processor 400 may control the communication circuit 410 to perform a measurement report related to the second external electronic device 210.

According to yet another embodiment, when the second external electronic device 210 is not included in the MBMS support list and the MBMS nonsupport list, the processor 400 may control the communication circuit 410 to perform a measurement report related to the second external electronic device 210.

According to various embodiments, the communication circuit 410 may enable the electronic device 101 to transmit and/or receive a signal and/or data to and/or from at least one external electronic device (e.g., the electronic device 102 or 104 or the server 108 of FIG. 1 or the first external electronic device 200 or the second external electronic device 210 of FIG. 2). According to yet another embodiment, the communication circuit 410 may receive data from the at least one external electronic device in the unicast or multicast mode. According to yet another embodiment, the communication circuit 410 may transmit data to the at least one external electronic device in the unicast mode. For example, the communication circuit 410 includes a radio-frequency integrated circuit (RFIC) and/or a radio-frequency front end (RFFE) for communication with the at least one external electronic device.

According to various embodiments, the memory 420 may store various pieces of data used by at least one component (e.g., the processor 400 and/or the communication circuit 410) of the electronic device 101. For example, the data may include information related to the MBMS support list and/or the MBMS nonsupport list. According to yet another embodiment, the memory 420 may store various instructions executable through the processor 400.

According to various embodiments, an electronic device (e.g., the electronic device 101 of FIG. 1, 2, 3, or 4) may include a communication circuit (e.g., the wireless communication module 192 of FIG. 1 or the communication circuit 410 of FIG. 4), a memory (e.g., the memory 130 of FIG. 1 or the memory 420 of FIG. 4) configured to store information related to a multimedia broadcast multicast service (MBMS) support list including information related to at least one cell supporting an MBMS and an MBMS nonsupport list including information related to at least one cell not supporting the MBMS, and at least one processor (e.g., the processor 120 of FIG. 1 or the processor 400 of FIG. 4) operatively connected to the communication circuit and the memory. According to yet another embodiment, the processor may receive data from a first cell (e.g., the first external electronic device 200 of FIG. 2) supporting the MBMS through the communication circuit, based on a multicast mode. According to yet another embodiment, the processor may detect a second cell (e.g., the second external electronic device 210 of FIG. 2), based on channel state information about the first cell. According to yet another embodiment, the processor may perform a measurement report related to the second cell when the second cell is included in the MBMS support list. According to yet another embodiment, the processor may restrict the measurement report related to the second cell when the second cell is included in the MBMS nonsupport list.

According to various embodiments, the at least one processor may perform the measurement report related to the second cell when the second cell is not included in the MBMS support list and the MBMS nonsupport list.

According to various embodiments, the at least one processor may identify whether the second cell supports the MBMS when a handover to the second cell is performed, based on the measurement report related to the second cell, may update the MBMS support list, based on information about the second cell when the second cell supports the MBMS, and may update the MBMS nonsupport list, based on the information related to the second cell when the second cell does not support the MBMS.

According to various embodiments, the at least one processor may identify whether the second cell is included in the MBMS support list or the MBMS nonsupport list when the electronic device detects the second cell in an RRC-connected state.

According to various embodiments, the at least one processor may identify the channel state information about the first cell when the second cell is included in the MBMS nonsupport list, and may restrict the measurement report related to the second cell when the channel state information about the first cell satisfies a specified measurement report restriction condition.

According to various embodiments, the at least one processor may perform the measurement report related to the second cell when the channel state information about the first cell does not satisfy the specified measurement report restriction condition.

According to various embodiments, the at least one processor may identify a restricted number of measurement reports related to the second cell when the second cell is included in the MBMS nonsupport list, and may restrict the measurement report related to the second cell when the restricted number of measurement reports related to the second cell satisfies a specified measurement report restriction condition.

According to various embodiments, the at least one processor may perform the measurement report related to the second cell when the restricted number of measurement reports related to the second cell does not satisfy the specified measurement report restriction condition.

According to various embodiments, the at least one processor may transmit data to the first cell through the communication circuit, based on a unicast mode.

Figure 5:
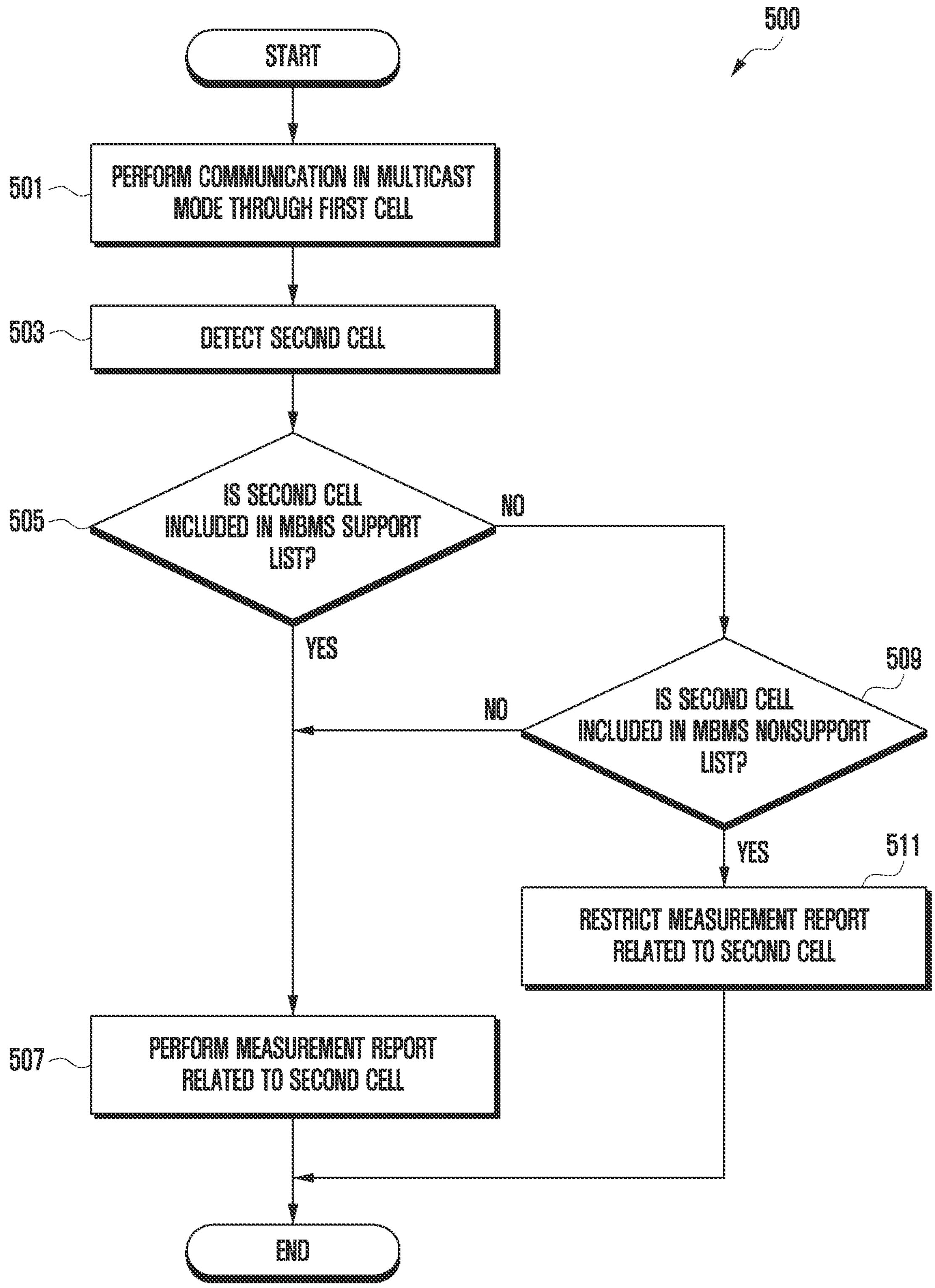
FIG. 5 is a flowchart illustrating that an electronic device restricts a measurement report related to a second cell according to an embodiment of the disclosure.

FIG. 5 is a flowchart illustrating that an electronic device restricts a measurement report related to a second cell according to an embodiment of the disclosure. In the following embodiments, operations may be sequentially performed, but are not necessarily performed sequentially. For example, the operations may be performed in a different order, or at least two operations may be performed in parallel. For example, the electronic device of FIG. 5 may be the electronic device 101 of FIG. 1, 2, 3, or 4.

Referring to FIG. 5, in a method 500, according to various embodiments, in operation 501, the electronic device (e.g., the processor 120 of FIG. 1 or the processor 400 of FIG. 4) may perform communication with a first cell (e.g., the first external electronic device 200 of FIG. 2) supporting an MBMS, based on a multicast mode. For example, the communication based on the multicast mode may include a series of operations of receiving data from the first external electronic device 200 supporting the MBMS in the multicast mode. According to an embodiment, the processor 400 may control a communication circuit 410 so that the electronic device 101 connects to (or registers with) an MBMS server through the first external electronic device 200 supporting the MBMS. According to another embodiment, the processor 400 may generate a floor control channel and a media channel for multicast, based on information related to generation of an MBMS subchannel received from the MBMS server through the first external electronic device 200. According to yet another embodiment, the processor 400 may control the communication circuit 410 to transmit information related to a switch to the multicast mode to the MBMS server, based on reception of information related to the MBMS subchannel. According to yet another embodiment, the processor 400 may receive data (e.g., a media packet) from the MBMS server through the communication circuit 410 in the multicast mode in response to the information related to the switch to the multicast mode. For example, the processor 400 receives data from the first external electronic device 200 through the media channel for multicast generated based on the information related to the MBMS subchannel. According to yet another embodiment, the processor 400 may transmit data to the first external electronic device 200 (or the MBMS server) in a unicast mode. For example, the first cell includes a first service area 202 in which communication is provided by the first external electronic device 200.

According to various embodiments, in operation 503, the electronic device (e.g., the processor 120 or 400) may detect a second cell to which the electronic device 101 is connectable through a scan. According to yet another embodiment, the processor 400 may identify state information about a channel with the external electronic device during the communication (e.g., data reception) with the first external electronic device 200 based on the multicast mode. For example, the state information about the channel includes at least one of a reference signal received power (RSRP), a reference signal received quality (RSRQ), a received signal strength indicator (RSSI), or a signal-to-interference plus noise ratio (SINR). According to yet another embodiment, when the state information about the channel with the first external electronic device 200 satisfies a specified reference condition, the processor 400 may identify through a scan whether there is another external electronic device with which the electronic device 101 is able to establish communication. For example, a state that satisfies the specified reference condition includes a state in which the state information about the channel with the first external electronic device 200 is a specified first reference quality or lower. For example, the second cell includes a second service area 212 in which communication is provided by a second external electronic device 210.

According to various embodiments, in operation 505, the electronic device (e.g., the processor 120 or 400) may identify whether the second cell detected through scan is included in an MBMS support list. According to yet another embodiment, when the electronic device 101 is in an RRC-connected state, the processor 400 may identify whether the second cell detected through the scan is included in the MBMS support list. For example, the MBMS support list includes information (e.g., a frequency and/or a physical cell ID (PCI)) related to an external electronic device (or a cell) supporting the MBMS.

According to various embodiments, when the second cell is included in the MBMS support list (e.g., "Yes" in operation 505), the electronic device (e.g., the processor 120 or 400) may perform a measurement report related to the second cell in operation 507. According to yet another embodiment, when the second cell is included in the MBMS support list, the processor 400 may determine that the second cell supports the MBMS. The processor 400 determines that multicast-mode communication may be maintained even through the second cell supporting the MBMS, and may thus control the communication circuit 410 to perform a measurement report related to the second cell.

According to various embodiments, when the second cell is not included in the MBMS support list (e.g., "No" in operation 505), the electronic device (e.g., the processor 120 or 400) may identify whether the second cell detected through the scan is included in an MBMS nonsupport list in operation 509. For example, the MBMS nonsupport list includes information (e.g., a frequency and/or a physical cell ID (PCI)) related to an external electronic device (or a cell) not supporting the MBMS.

According to various embodiments, when the second cell is not included in the MBMS nonsupport list (e.g., "No" in operation 509), the electronic device (e.g., the processor 120 or 400) may perform a measurement report related to the second cell in operation 507. According to yet another embodiment, when the second cell is included in the MBMS support list and the MBMS nonsupport list, the processor 400 may recognize that the processor 400 is unable to determine whether the second cell supports the MBMS. When the processor 400 is unable to determine whether the second cell supports the MBMS, the processor 400 may control the communication circuit 410 to perform a measurement report related to the second cell.

According to various embodiments, when the second cell is included in the MBMS nonsupport list (e.g., "Yes" in operation 509), the electronic device (e.g., the processor 120 or 400) may restrict a measurement report related to the second cell in operation 511. According to yet another embodiment, when the second cell is included in the MBMS nonsupport list, the processor 400 may determine that the second cell does not support the MBMS. The processor 400 may control the communication circuit 410 to restrict a measurement report related to the second cell such that a handover to the second cell not supporting the MBMS is restricted. According to yet another embodiment, the processor 400 may selectively restrict a measurement report related to the second external electronic device 210 (or the second cell), based on the state information about the channel with the first external electronic device 200 (or the first cell). For example, when the state information about the channel with the first external electronic device 200 (or the first cell) exceeds a specified second reference quality, the processor 400 controls the communication circuit 410 to restrict a measurement report related to the second external electronic device 210. For example, when the state information about the channel with the first external electronic device 200 is the specified second standard quality or lower, the processor 400 controls the communication circuit 410 to perform a measurement report related to the second external electronic device 210. According to an embodiment, the processor 400 selectively restricts a measurement report related to the second external electronic device 210, based on the restricted number of measurement reports related to the second external electronic device 210 (or the second cell). For example, when the restricted number of measurement reports related to the second external electronic device 210 is a specified reference number or less, the processor 400 controls the communication circuit 410 to restrict a measurement report related to the second external electronic device 210. For example, when the restricted number of measurement reports related to the second external electronic device 210 exceeds the specified reference number, the processor 400 controls the communication circuit 410 to perform a measurement report related to the second external electronic device 210. For example, restricting a measurement report related to the second external electronic device 210 includes a series of operations of not performing a measurement report related to the second external electronic device 210 not supporting the MBMS. For example, when a measurement report related to the second external electronic device 210 is restricted, the processor 400 controls the communication circuit 410 to perform a measurement report related to an external electronic device other than the second external electronic device 210.

According to various embodiments, the electronic device 101 may maintain the communication (or connection) with the first cell (or the first external electronic device 200) supporting the MBMS by restricting a measurement report related to the second cell (or the second external electronic device 210) not supporting the MBMS.

According to various embodiments, when the electronic device 101 performs a measurement report related to the second cell, the electronic device 101 may perform a handover to the second cell, based on information related to a handover (e.g., handover instruction information) provided from a network 300. For example, the handover includes a series of operations of the electronic device 101 switching the communication with the first cell to the second cell.

Figure 6:
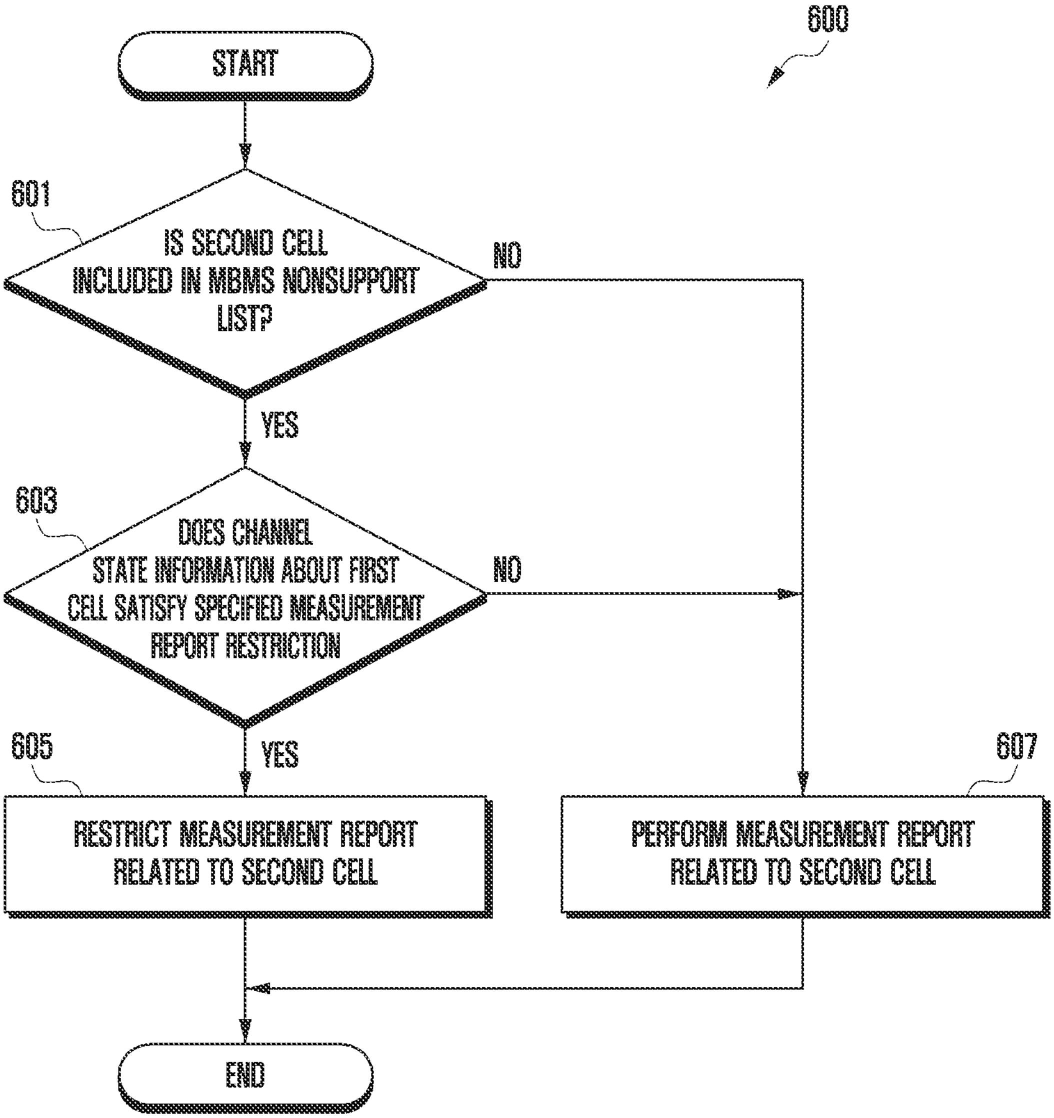
FIG. 6 is a flowchart illustrating that an electronic device restricts a measurement report related to a second cell, based on a communication quality of a first cell according to an embodiment of the disclosure.

FIG. 6 is a flowchart illustrating that an electronic device restricts a measurement report related to a second cell, based on a communication quality of a first cell according to an embodiment of the disclosure. According to an embodiment, at least part of FIG. 6 may include detailed operations of operation 507 to operation 511 of FIG. 5. In the following embodiments, operations may be sequentially performed, but are not necessarily performed sequentially. For example, the operations may be performed in a different order, or at least two operations may be performed in parallel. For example, the electronic device of FIG. 6 may be the electronic device 101 of FIG. 1, 2, 3, or 4.

Referring to FIG. 6, in a method 600, according to various embodiments, when a second cell detected through a scan is not included in an MBMS support list (e.g., "No" in operation 505 of FIG. 5), the electronic device (e.g., the processor 120 of FIG. 1 or the processor 400 of FIG. 4) may identify whether the second cell detected through the scan is included in an MBMS nonsupport list in operation 601. According to an embodiment, when the second cell detected through the scan is not included in the MBMS support list in an RRC-connected state of the electronic device 101, the processor 400 may identify whether the second cell is included in the MBMS nonsupport list. For example, the MBMS nonsupport list includes information (e.g., a frequency and/or a physical cell ID (PCI)) related to an external electronic device (or a cell) not supporting an MBMS.

According to various embodiments, when the second cell is included in the MBMS nonsupport list (e.g., “Yes” in operation 601), the electronic device (e.g., the processor 120 or 400) may identify whether channel state information about a first cell (e.g., the first external electronic device 200 of FIG. 2) supporting the MBMS satisfies a specified measurement report restriction condition in operation 603. For example, a state that satisfies the specified measurement report restriction includes a state in which the channel state information about the first cell exceeds a specified second reference quality (e.g., about −110 dBm). For example, a state that does not satisfy the specified measurement report restriction condition includes a state in which the channel state information about the first cell is the specified second reference quality or lower.

According to various embodiments, when the channel state information about the first cell supporting the MBMS satisfies the specified measurement report restriction condition (e.g., “Yes” in operation 603), the electronic device (e.g., the processor 120 or 400) may restrict a measurement report related to the second cell in operation 605. According to another embodiment, when the channel state information about the first cell satisfies the specified measurement report restriction condition, the processor 400 may determine that communication is possible through the first cell. The processor 400 may control a communication circuit 410 to restrict a measurement report related to the second cell (e.g., the second external electronic device 210) so that multicast-mode communication through the first cell is maintained. For example, when a measurement report related to the second external electronic device 210 is restricted, the processor 400 controls the communication circuit 410 to perform a measurement report related to an external electronic device other than the second external electronic device 210. For example, restricting a measurement report related to the second external electronic device 210 includes a series of operations of not performing a measurement report related to the second external electronic device 210 not supporting the MBMS.

According to various embodiments, when the second cell is not included in the MBMS nonsupport list (e.g., “No” in operation 601), the electronic device (e.g., the processor 120 or 400) may perform a measurement report related to the second cell in operation 607. According to yet another embodiment, when the second cell is included in the MBMS support list and the MBMS nonsupport list, the processor 400 may recognize that the processor 400 is unable to determine whether the second cell supports the MBMS. When the processor 400 is unable to determine whether the second cell supports the MBMS, the processor 400 may control the communication circuit 410 to perform a measurement report related to the second cell.

According to various embodiments, when the channel state information about the first cell supporting the MBMS does not satisfy the specified measurement report restriction condition (e.g., “No” in operation 603), the electronic device (e.g., the processor 120 or 400) may perform a measurement report related to the second cell in operation 607. According to yet another embodiment, when the channel state information about the first cell does not satisfy the specified measurement report restriction condition, the processor 400 may determine that the communication through the first cell is restricted. The processor 400 may control the communication circuit 410 to perform a measurement report related to the second cell (e.g., the second external electronic device 210), based on determining that the communication through the first cell is restricted.

According to various embodiments, when the electronic device 101 is unable to determine whether the second cell detected through the scan supports the MBMS, the electronic device 101 may perform a measurement report related to the second cell. When a handover to the second cell is performed, the electronic device 101 may identify whether the second cell supports the MBMS. According to yet another embodiment, when receiving SIB 13 and SIB 15 from the second cell, the electronic device 101 may determine that the second cell supports the MBMS. According to yet another embodiment, when the second cell supports the MBMS, the electronic device 101 may update the MBMS support list, based on information related to the second cell. According to yet another embodiment, when not receiving SIB 13 and SIB 15 from the second cell, the electronic device 101 may determine that the second cell does not support the MBMS. According to yet another embodiment, when the second cell does not support the MBMS, the electronic device 101 may update the MBMS nonsupport list, based on the information related to the second cell.

Figure 7:
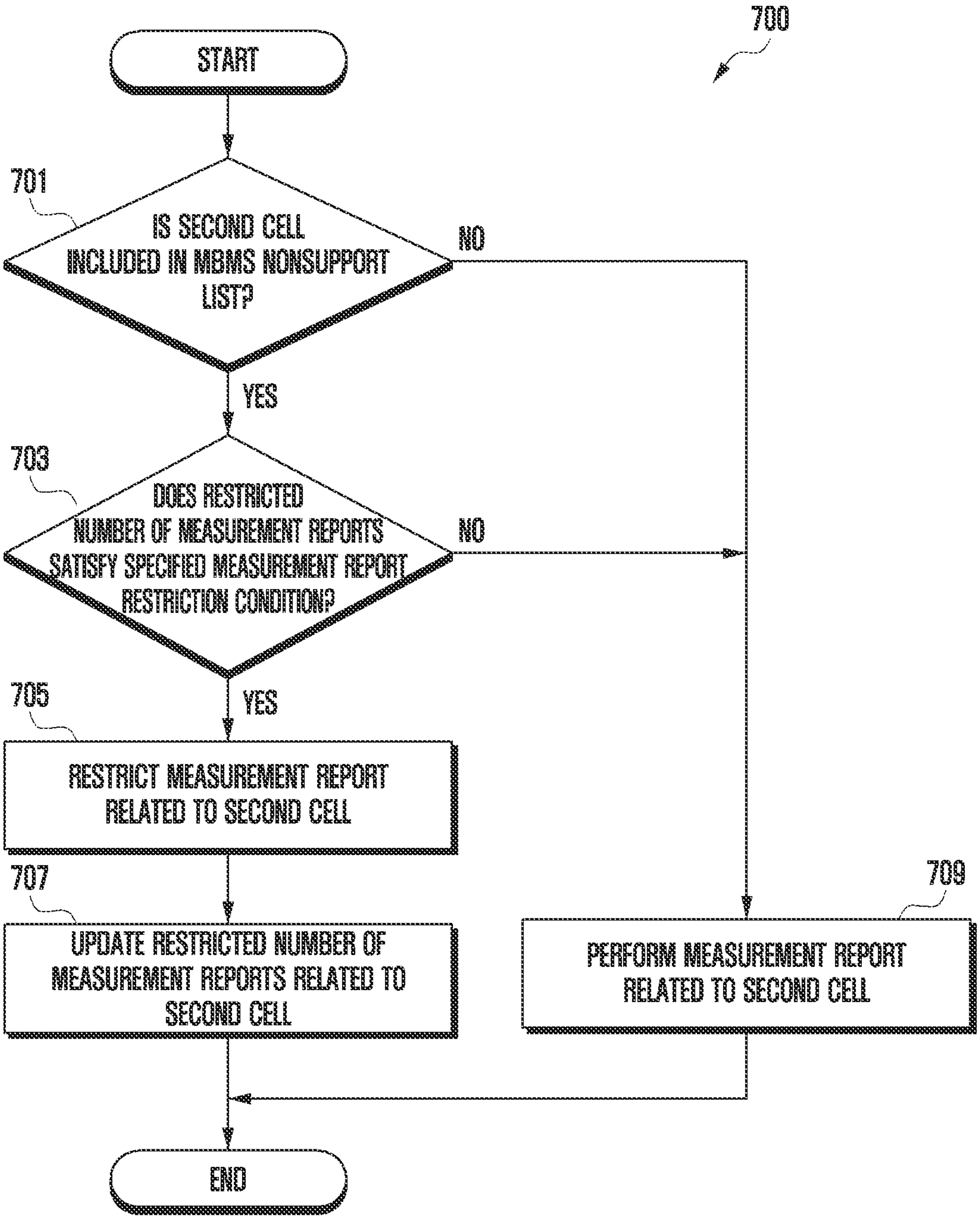
FIG. 7 is a flowchart illustrating that an electronic device restricts a measurement report related to a second cell, based on the restricted number of measurement reports according to an embodiment of the disclosure.

FIG. 7 is a flowchart illustrating that an electronic device restricts a measurement report related to a second cell, based on the restricted number of measurement reports according to an embodiment of the disclosure. According to an embodiment, at least part of FIG. 7 may include detailed operations of operation 507 to operation 511 of FIG. 5. In the following embodiments, operations may be sequentially performed, but are not necessarily performed sequentially. For example, the operations may be performed in a different order, or at least two operations may be performed in parallel. For example, the electronic device of FIG. 7 may be the electronic device 101 of FIG. 1, 2, 3, or 4.

Referring to FIG. 7, in a method 700, according to various embodiments, when a second cell detected through a scan is not included in an MBMS support list (e.g., “No” in operation 505 of FIG. 5), the electronic device (e.g., the processor 120 of FIG. 1 or the processor 400 of FIG. 4) may identify whether the second cell detected through the scan is included in an MBMS nonsupport list in operation 701. According to an embodiment, when the second cell detected through the scan is not included in the MBMS support list in an RRC-connected state of the electronic device 101, the processor 400 may identify whether the second cell is included in the MBMS nonsupport list.

According to various embodiments, when the second cell is included in the MBMS nonsupport list (e.g., “Yes” in operation 701), the electronic device (e.g., the processor 120 or 400) may identify whether the restricted number of measurement reports related to the second cell (e.g., the second external electronic device 210 of FIG. 2) satisfies a specified measurement report restriction condition in operation 703. For example, a state that satisfies the specified measurement report restriction condition includes a state in which the restricted number of measurement reports related to the second cell is a specified reference number or less. For example, a state that does not satisfy the specified measurement report restriction condition includes a state in which the restricted number of measurement reports related to the second cell exceeds the specified reference number.

According to various embodiments, when the restricted number of measurement reports related to the second cell not supporting an MBMS satisfies the specified measurement report restriction condition (e.g., “Yes” in operation 703), the electronic device (e.g., the processor 120 or 400) may restrict a measurement report related to the second cell in operation 705. According to another embodiment, when a measurement report related to the second cell (e.g., the second external electronic device 210) is restricted, the processor 400 may control a communication circuit 410 to perform a measurement report related to a cell (or an external electronic device) other than the second cell. For example, restricting a measurement report related to the second cell includes a series of operations of not performing a measurement report related to the second cell not supporting the MBMS.

According to various embodiments, the electronic device (e.g., the processor 120 or 400) may update the restricted number of measurement reports related to the second cell in operation 707. According to yet another embodiment, when restricting a measurement report related to the second cell, the processor 400 increases the restricted number of measurement reports related to the second cell by a reference value (e.g., about "1").

According to various embodiments, when the second cell is not included in the MBMS nonsupport list (e.g., "No" in operation 701), the electronic device (e.g., processor 120 or 400) may perform a measurement report related to the second cell in operation 709. According to yet another embodiment, when the second cell is included in the MBMS support list and the MBMS nonsupport list, the processor 400 may recognize that the processor 400 is unable to determine whether the second cell supports the MBMS. When the processor 400 is unable to determine whether the second cell supports the MBMS, the processor 400 may control the communication circuit 410 to perform a measurement report related to the second cell. According to yet another embodiment, when performing a measurement report related to the second cell, the processor 400 may initialize the restricted number of measurement reports related to the second cell.

According to various embodiments, when the restricted number of measurement reports related to the second cell not supporting the MBMS does not satisfy the specified measurement report restriction condition (e.g., "No" in operation 703), the electronic device (e.g., the processor 120 or 400) may perform a measurement report related to the second cell in operation 709. According to yet another embodiment, the scan to detect the second cell may be performed when channel state information about the first cell is a specified first reference quality or lower. When the restricted number of measurement reports related to the second cell does not satisfy the specified measurement report restriction condition, the processor 400 may determine that the channel state information about the first cell is relatively low and thus there is a relatively high probability that communication through the first cell is restricted. The processor 400 may control the communication circuit 410 to perform a measurement report related to the second cell (e.g., the second external electronic device 210), based on determining that there is a relatively high probability that communication through the first cell is restricted.

Figure 8:
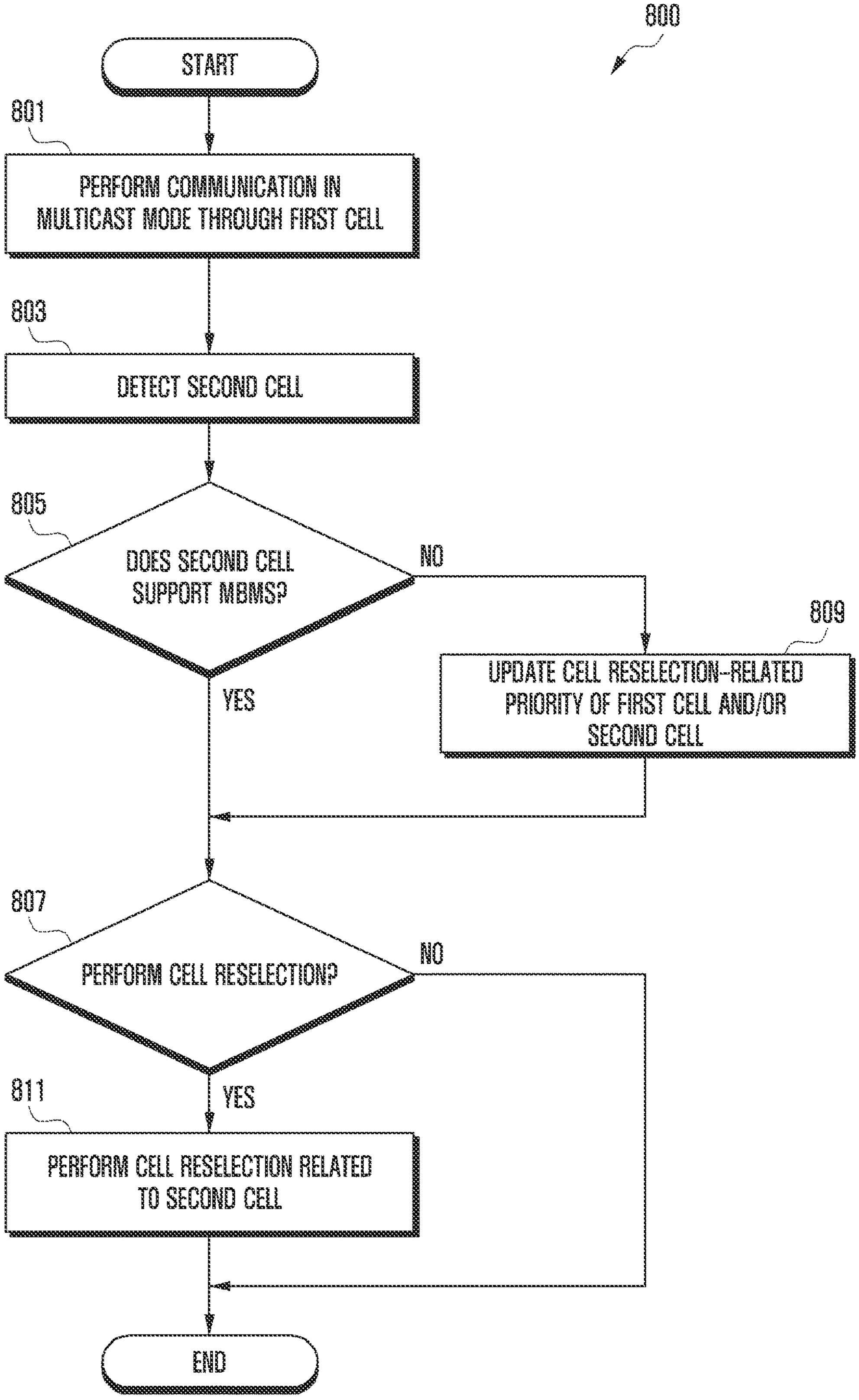
FIG. 8 is a flowchart illustrating that an electronic device restricts cell reselection according to an embodiment of the disclosure.

FIG. 8 is a flowchart illustrating that an electronic device restricts cell reselection according to an embodiment of the disclosure. In the following embodiments, operations may be sequentially performed, but are not necessarily performed sequentially. For example, the operations may be performed in a different order, or at least two operations may be performed in parallel. For example, the electronic device of FIG. 8 may be the electronic device 101 of FIG. 1, 2, 3, or 4.

Referring to FIG. 8, in a method 800, according to various embodiments, in operation 801, the electronic device (e.g., the processor 120 of FIG. 1 or the processor 400 of FIG. 4) may perform communication with a first cell (e.g., the first external electronic device 200 of FIG. 2) supporting an MBMS, based on a multicast mode. For example, the communication based on the multicast mode may include a series of operations of receiving data from the first external electronic device 200 supporting the MBMS in the multicast mode. According to an embodiment, the processor 400 may control a communication circuit 410 so that the electronic device 101 connects to (or registers with) an MBMS server through the first external electronic device 200 supporting the MBMS.

According to another embodiment, the processor 400 may control the communication circuit 410 to transmit information related to a switch to the multicast mode to the MBMS server, based on information related to generation of an MBMS subchannel received from the MBMS server through the first external electronic device 200. According to yet another embodiment, the processor 400 may receive data (e.g., a media packet) from the MBMS server through the communication circuit 410 in the multicast mode in response to the information related to the switch to the multicast mode. For example, the data (e.g., the media packet) is received through a media channel for multicast generated based on information related to the MBMS subchannel. According to yet another embodiment, the processor 400 may transmit data to the first external electronic device 200 (or the MBMS server) in a unicast mode. For example, the first cell may include a first service area 202 in which communication is provided by the first external electronic device 200.

According to various embodiments, in operation 803, the electronic device (e.g., the processor 120 or 400) may detect a second cell to which the electronic device 101 is connectable through a scan. According to yet another embodiment, the processor 400 may identify state information about a channel with the external electronic device during the communication (e.g., data reception) with the first external electronic device 200 based on the multicast mode. For example, the state information about the channel includes at least one of a reference signal received power (RSRP), a reference signal received quality (RSRQ), a received signal strength indicator (RSSI), or a signal-to-interference plus noise ratio (SINR). According to yet another embodiment, when the state information about the channel with the first external electronic device 200 satisfies a specified reference condition, the processor 400 may identify through a scan whether there is another external electronic device with which the electronic device 101 is able to establish communication. For example, a state that satisfies the specified reference condition includes a state in which the state information about the channel with the first external electronic device 200 is a specified first reference quality or lower. For example, the second cell includes a second service area 212 in which communication is provided by a second external electronic device 210.

According to various embodiments, in operation 805, the electronic device (e.g., the processor 120 or 400) may identify whether the second cell detected through the scan supports the MBMS. According to yet another embodiment, when the first cell and the second cell use the same frequency (or frequency band), the processor 400 may identify whether the second cell supports the MBMS. According to yet another embodiment, when the first cell and the second cell use different frequencies (or frequency bands), the processor 400 may terminate an embodiment of restricting cell reselection. According to yet another embodiment, when the electronic device 101 in an RRC-idle state or RRC-inactive state receives SIB 13 and SIB 15 from the second cell, the processor 400 may determine that the second cell supports the MBMS. According to yet another embodiment, when the electronic device 101 in the RRC-idle state or RRC-inactive state does not receive SIB 13 and SIB 15 from the second cell, the processor 400 may determine that the second cell does not support the MBMS. For example, the RRC-idle state or RRC-inactive state may include a state in which RRC connection is released (e.g., RRC release) due to no data being transmitted and/or received for a specified time while MBMS-based communication (e.g., an MCPTT call) is connected.

According to various embodiments, when the second cell supports the MBMS (e.g., "Yes" in operation 805), the electronic device (e.g., processor 120 or 400) may determine whether to perform cell reselection to the second cell in operation 807. According to yet another embodiment, the processor 400 may compare cell reselection-related priorities of the first cell and the second cell. According to yet another embodiment, when the cell reselection-related priority of the first cell is higher than the cell reselection-related priority of the second cell, the processor 400 may determine not to perform cell reselection to the second cell. According to yet another embodiment, when the cell reselection-related priority of the second cell is higher than the cell reselection-related priority of the first cell, the processor 400 may determine to perform cell reselection to the second cell. For example, the cell reselection-related priority of the first cell is configured based on at least one of channel state information about the first cell (e.g., a measured RSRP of the first cell, $Q_{meas\text{-}s,\ n}$), a hysteresis value (e.g., $Q_{Hyst}$) according to ranking criteria, an additional offset ($Q_{offsettemp}$) related to cell reselection or cell selection, or an offset ($Q_{offsetscptm}$) used for cell reselection for reception of a single-cell point-to-multipoint (SCP™) service. For example, the cell reselection-related priority of the second cell may be configured based on at least one of channel state information about the second cell (e.g., a measured RSRP of the second cell, $Q_{meas\text{-}s,\ n}$), an offset ($Q_{offset}$) between the first cell and the second cell, an additional offset ($Q_{offsettemp}$) related to cell reselection or cell selection, or an offset ($Q_{offsetscptm}$) used for cell reselection for reception of an SCP™ service.

According to various embodiments, when the second cell does not support the MBMS (e.g., "No" in operation 805), the electronic device (e.g., processor 120 or 400) may update the cell reselection-related priority of the first cell and/or the second cell in operation 809. According to yet another embodiment, the processor 400 may apply a reference offset to the cell reselection-related priority of the first cell so that the cell reselection-related priority of the first cell is relatively high, as shown in Equation 1. According to yet another embodiment, the processor 400 may apply a reference offset to the cell reselection-related priority of the second cell so that the cell reselection-related priority of the first cell is relatively high, as shown in Equation 2.

According to various embodiments, when updating the cell reselection-related priority of the first cell and/or the second cell (e.g., operation 809), the electronic device (e.g., the processor 120 or 400) may determine whether to perform cell reselection to the second cell in operation 807. According to yet another embodiment, the processor 400 may compare updated cell reselection-related priorities of the first cell and/or the second cell. According to yet another embodiment, when the cell reselection-related priority (or updated priority) of the first cell is higher than the cell reselection-related priority (or updated priority) of the second cell, the processor 400 may determine not to perform cell reselection to the second cell. According to yet another embodiment, when the cell reselection-related priority (or updated priority) of the second cell is higher than the cell reselection-related priority (or updated priority) of the first cell, the processor 400 may determine to perform cell reselection to the second cell.

According to various embodiments, when determining to perform cell reselection to the second cell (e.g., "Yes" in operation 807), the electronic device (e.g., the processor 120 or 400) may perform cell reselection related to the second cell in operation 811. According to yet another embodiment, when the second cell supports the MBMS, the processor 400 may receive data through the second cell in the multicast mode, based on the cell reselection related to the second cell. According to yet another embodiment, when the second cell does not support the MBMS, the processor 400 may switch a mode for communication with the second cell to the unicast mode based on the cell reselection related to the second cell.

According to various embodiments, when determining not to perform cell reselection to the second cell (e.g., "No" in operation 807), the electronic device (e.g., the processor 120 or 400) may terminate the embodiment of restricting cell reselection. According to yet another embodiment, when determining not to perform cell reselection to the second cell, the processor 400 may maintain the multicast-mode communication through the first cell.

According to various embodiments, when a difference (or difference value) in channel state information between the first cell supporting the MBMS and the second cell not supporting the MBMS is within a specified reference range, the electronic device 101 may maintain the communication (or connection) with the first cell, based on update of the cell reselection-related priority of the first cell and/or the second cell.

According to various embodiments, an operating method of an electronic device (e.g., the electronic device 101 of FIG. 1, 2, 3, or 4) may include receiving data from a first cell supporting an MBMS, based on a multicast mode. According to yet another embodiment, the operating method of the electronic device may include detecting a second cell (e.g., the second external electronic device 210 of FIG. 2), based on channel state information about the first cell (e.g., the first external electronic device 200 of FIG. 2). According to yet another embodiment, the operating method of the electronic device may include performing a measurement report related to the second cell when the second cell is included in an MBMS support list stored in a memory (e.g., the memory 130 of FIG. 1 or the memory 420 of FIG. 4). According to yet another embodiment, the operating method of the electronic device may include restricting the measurement report related to the second cell when the second cell is included in an MBMS nonsupport list.

According to various embodiments, the operating method of the electronic device may include performing the measurement report related to the second cell when the second cell is not included in the MBMS support list and the MBMS nonsupport list.

According to various embodiments, the operating method of the electronic device may include identifying whether the second cell supports the MBMS when a handover to the second cell is performed, based on the measurement report related to the second cell, updating the MBMS support list, based on information about the second cell when the second cell supports the MBMS, and updating the MBMS nonsupport list, based on the information related to the second cell when the second cell does not support the MBMS.

According to various embodiments, the operating method of the electronic device may include identifying whether the second cell is included in the MBMS support list or the MBMS nonsupport list when the electronic device detects the second cell in an RRC-connected state.

According to various embodiments, the restricting of the measurement report related to the second cell may include identifying the channel state information about the first cell when the second cell is included in the MBMS nonsupport list, and restricting the measurement report related to the second cell when the channel state information about the first cell satisfies a specified measurement report restriction condition.

According to various embodiments, the operating method of the electronic device may include performing the measurement report related to the second cell when the channel state information about the first cell does not satisfy the specified measurement report restriction condition.

According to various embodiments, the restricting of the measurement report related to the second cell may include identifying a restricted number of measurement reports related to the second cell when the second cell is included in the MBMS nonsupport list, and restricting the measurement report related to the second cell when the restricted number of measurement reports related to the second cell satisfies a specified measurement report restriction condition.

According to various embodiments, the operating method of the electronic device may include performing the measurement report related to the second cell when the restricted number of measurement reports related to the second cell does not satisfy the specified measurement report restriction condition.

According to various embodiments, the operating method of the electronic device may include initializing the restricted number of measurement reports related to the second cell, based on performing the measurement report related to the second cell.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a communication circuit;

memory storing instructions and information related to a multimedia broadcast multicast service (MBMS) support list comprising information related to at least one cell supporting an MBMS and an MBMS nonsupport list comprising information related to at least one cell not supporting the MBMS; and at least one processor communicatively coupled to the communication circuit and the memory, wherein the instructions, when executed by the at least one processor individually or collectively, cause the electronic device to:

receive data from a first cell supporting the MBMS through the communication circuit, based on a multicast mode, detect a second cell different from the first cell by performing a scan in response to channel state information of the first cell being equal to or less than a first reference value, determine whether the second cell is included in the MBMS support list or the MBMS nonsupport list, when the second cell is included in the MBMS support list, perform a measurement report related to the second cell, when the second cell is included in the MBMS nonsupport list:

identify channel state information of the first cell, restrict the measurement report related to the second cell in response to the identified channel state information of the first cell being greater than a second reference value, and perform the measurement report related to the second cell in response to channel state information of the first cell being equal to or less than the second reference value, and based on a determination that the second cell is not included in the MBMS support list and the MBMS nonsupport list, perform the measurement report related to the second cell.

2. The electronic device of claim 1, wherein the instructions, when executed by the at least one processor individually or collectively, is further cause the electronic device to:

identify whether the second cell supports the MBMS when a handover to the second cell is performed, based on the measurement report related to the second cell, update the MBMS support list, based on information about the second cell when the second cell supports the MBMS, and update the MBMS nonsupport list, based on the information related to the second cell when the second cell does not support the MBMS.

3. The electronic device of claim 1, wherein the instructions, when executed by the at least one processor individually or collectively, further cause the electronic device to identify whether the second cell is included in the MBMS support list or the MBMS nonsupport list when the electronic device detects the second cell in a radio resource control (RRC)-connected state.

4. The electronic device of claim 1, wherein the instructions, when executed by the at least one processor individually or collectively, further cause the electronic device to transmit data to the first cell through the communication circuit, based on a unicast mode.

5. The electronic device of claim 1, wherein the channel state information includes at least one of a reference signal received power (RSRP), a reference signal received quality (RSRQ), a received signal strength indicator (RSSI), or a signal-to-interference plus noise ratio (SINR).

6. A method of operating an electronic device, the method comprising:

receiving data from a first cell supporting a multimedia broadcast multicast service (MBMS), based on a multicast mode;

detecting a second cell different from the first cell by performing a scan in response to channel state information of the first cell being equal to or less than a first reference value;

determining whether the second cell is included in the MBMS support list or the MBMS nonsupport list;

when the second cell is included in an MBMS support list stored in a memory of the electronic device, performing a measurement report related to the second cell;

when the second cell is included in an MBMS nonsupport list stored in the memory:

identifying channel state information of the first cell;

restricting the measurement report related to the second cell in response to the identified channel state information of the first cell being greater than a second reference value; and performing the measurement report related to the second cell in response to channel state information of the first cell being equal to or less than the second reference value; and based on a determination that the second cell is not included in the MBMS support list and the MBMS nonsupport list, performing the measurement report related to the second cell.

7. The method of claim 6, further comprising:

identifying whether the second cell supports the MBMS when a handover to the second cell is performed, based on the measurement report related to the second cell;

updating the MBMS support list, based on information about the second cell when the second cell supports the MBMS; and updating the MBMS nonsupport list, based on the information related to the second cell when the second cell does not support the MBMS.

8. The method of claim 6, further comprising:

identifying whether the second cell is included in the MBMS support list or the MBMS nonsupport list when the electronic device detects the second cell in a radio resource control (RRC)-connected state.

9. The method of claim 6, wherein the channel state information includes at least one of a reference signal received power (RSRP), a reference signal received quality (RSRQ), a received signal strength indicator (RSSI), or a signal-to-interference plus noise ratio (SINR).

* * * * *